United States Patent [19]
Bills et al.

[11] Patent Number: 5,452,613
[45] Date of Patent: Sep. 26, 1995

[54] WIDE RANGE VACUUM GAUGE

[75] Inventors: Daniel G. Bills, Boulder; Michael D. Borenstein, Louisville, both of Colo.

[73] Assignee: Granville-Phillips Company, Boulder, Colo.

[21] Appl. No.: 130,128

[22] Filed: Oct. 4, 1993

[51] Int. Cl.[6] ..................................................... G01L 7/08
[52] U.S. Cl. .................. 73/745; 73/744; 73/752; 73/746; 73/706; 73/715; 73/756
[58] Field of Search .............................. 73/744, 745, 752, 73/746, 706, 715, 756

[56] References Cited

U.S. PATENT DOCUMENTS

| | | | |
|---|---|---|---|
| 4,246,799 | 1/1981 | Myles | 73/744 |
| 4,413,526 | 11/1983 | Delajoud. | |
| 4,431,985 | 2/1984 | Mott | 73/701 |
| 4,527,430 | 7/1985 | Leathers | 73/745 |
| 4,730,496 | 3/1988 | Knecht et al.. | |
| 4,823,603 | 4/1989 | Ferran et al.. | |
| 5,022,270 | 6/1991 | Rud, Jr.. | |
| 5,040,579 | 8/1991 | Kawamura et al.. | |
| 5,134,887 | 8/1992 | Bell. | |
| 5,157,973 | 10/1992 | Ciminelli. | |
| 5,161,415 | 11/1992 | Kodama et al.. | |
| 5,174,157 | 12/1992 | Obermeier et al. | 73/715 |
| 5,212,989 | 5/1993 | Kodama et al. | 73/706 |
| 5,222,397 | 6/1993 | Kodama | 73/706 |
| 5,307,685 | 5/1994 | Bloome et al. | 73/756 |
| 5,319,981 | 6/1994 | Mei et al. | 73/706 |

OTHER PUBLICATIONS

Pressure Gauge Handbook, Edited by Philip W. Harland, Metek–U.S. Gauge Division p. 10.
Pressure Measurement in Vacuum Systems, by J. H. Leck, Second Edition (Chapman & Hall, London 1964, pp. 3–7.

Primary Examiner—Richard E. Chilcot, Jr.
Assistant Examiner—Jewel V. Artis
Attorney, Agent, or Firm—Sixbey Friedman Leedom & Ferguson; Gerald J. Ferguson, Jr.; Donald R. Studebaker

[57] ABSTRACT

A device for determining a pressure of gas in an evacuated chamber including a cylinder positioned in fluid communication with the evacuated chamber with the cylinder forming a compressed gas chamber, a reciprocating piston received within the cylinder and mounted for reciprocal movement therein, a port or valve for providing selective fluid communication between the compressed gas chamber and the evacuated chamber is disclosed. A drive mechanism is provided for reciprocating the piston between a retracted position, where the compressed gas chamber communicates with the evacuated chamber, and an extended position where communication between the compressed gas chamber and the evacuated chamber is interrupted, the position being a position where a pressure transducer determines that a predetermined pressure differential between the chambers has been reached. In the preferred embodiment, a stepper motor is used to measure a distance travelled by the piston at the point where the predetermined pressure differential is reached. Utilizing these parameters, a processor then determines the pressure of the gas within the evacuated chamber.

36 Claims, 4 Drawing Sheets

WIDE RANGE VACUUM GAUGE

TECHNICAL FIELD OF THE INVENTION

The present invention relates to a vacuum gauge for measuring pressure in a vacuum system over a wide pressure range. More particularly, the present invention relates to a vacuum gauge and method for measuring pressure in a vacuum system wherein gas leakage in the measuring means is taken into account when determining the pressure in the vacuum system.

BACKGROUND OF THE INVENTION

It has long been known that a liquid manometer can be used to measure the pressure of gases that obey Boyles Law by compressing the gas a known amount prior to making the measurement. The McLeod gauge, once widely used for measuring low pressures, utilizes this principle, as discussed in, J. H. Leck, *Pressure Measurement in Vacuum Systems*, Second Edition (Chapman and Hall, London 1964) pp. 3–7. A mercury piston is used to compress gas trapped in a known volume by a measurable amount thereby permitting the unknown pressure to be calculated. In one mode of operation, both the compression ratio and pressure differential created by compression of the gas are variables. In the second mode, the compression ratio is fixed but the pressure differential is a variable. At best, a McLeod gauge is a fragile, large, cumbersome gauge which requires considerable operator skill to manually make a measurement of pressure. A single pressure measurement is carried out over an extended period of time in that the mercury must be transferred slowly to avoid disastrous results. Also, mercury vapor is a health hazard if inhaled, ingested, or absorbed through the skin, and mercury vapor is anathema in modern day vacuum systems. However, mercury or other liquid which does not wet the inner surfaces is required to prevent leakage of the compressed gas in a McLeod gauge. McLeod gauges have been largely replaced by modern capacitance manometers.

As is known, diaphragm vacuum gauges measure absolute pressure independent of gas species. Such gauges which measure force per unit area are typically used for measuring low pressures of gas mixtures where measurement of ionization currents in an ionization gauge or heat lost from a hot wire are ineffective: where high accuracy is required; or of corrosive or hostile gases. At low pressure, the force per unit area exerted by the gas molecules on a surface is extremely small so very thin diaphragms must be used to achieve the required sensitivity. Producers of such gauges are now providing 1 and 0.1 Torr full scale sensors with 4 to 5 decades of dynamic range in an attempt to satisfy user requirements. However, the force per unit area exerted on a surface by a gas at, for example, $1 \times 10^{-4}$ Torr is only about $2 \times 10^{-6}$ psi. It is apparent that a gauge capable of measuring such a small force per unit area will be extremely sensitive to mechanical and thermally induced stresses. Even a slight overpressure will cause a significant zero shift in such instruments incorporating these sensitive diaphragms.

U.S. Pat. No. 4,413,526 to Delajoud issued Nov. 5, 1983, discloses a device for measurement of fluid pressures including a vertical cylinder, a piston adapted to slide in the cylinder with viscous friction with the pressure to be measured being applied to the upper face of the piston which rotates the piston inside the cylinder. An electromagnetic precision weighing machine including a shaft and piston arrangement to which the pressure to be measured is applied is used to measure the force on the piston. The gas pressure which is to be measured acts on the piston, the force of which corresponds to the product of the affected area of the piston and the pressure difference across the piston. Devices such as this are not useful in most vacuum measurement applications because of gas leakage.

In an effort to overcome some of the above-noted shortcomings, a capacitance manometer was developed and disclosed in U.S. Pat. No. 4,823,603 to Ferran et al. issued Apr. 25, 1989. Therein, a capacitance manometer having stress relief for a fixed electrode including a thin electrically conductive diaphragm fixedly mounted to a housing comprising an electrode of a variable capacitor is disclosed. While the manometer set forth therein solves the problem associated with capacitance changes caused by temperature and a stray capacitance caused by leakage currents through a dielectric ceramic material, the disclosed manometer is still very sensitive to mechanical disturbances and requires a reference pressure for absolute pressure measurement.

In yet another attempt to overcome the above noted shortcomings, U.S. Pat. No. 5,022,207 to Rud Jr. issued Jun. 11, 1991, discloses a transmitter having a pressure sensor for sensing pressure and an overpressure protection means for limiting the pressure applied to the pressure sensor when the applied pressures exceeds a preselected limit.

Clearly, there is a need for a gauge which can measure low pressures without being sensitive to mechanical or thermal stresses or to overpressure. Further, it is desirable to measure even lower pressures than can be measured today with typical sensitive diaphragm gauges. It would also be desirable to be able to utilize a single diaphragm thickness over a wide pressure range rather than resort to installing a separate gauge for each pressure range, and to utilize a differential diaphragm manometer rather than an absolute manometer to measure absolute pressure. These needs and advantages can be achieved in accordance with the present invention and will become apparent from the following description.

SUMMARY OF THE INVENTION

A primary object of the present invention is to provide a vacuum gauge which overcomes the above noted shortcomings associated with the prior art devices.

A further object of the present invention is to provide a diaphragm gauge which can accurately measure low pressures utilizing a thicker diaphragm than in prior art devices intended for the same pressure range.

Another object of the present invention is to provide a diaphragm gauge which is relatively immune to mechanical and thermal disturbances by rapidly and periodically trapping and compressing a volume of trapped gas to a higher pressure before measuring the pressure differential across the diaphragm.

Another object of the present invention is to provide a diaphragm gauge to measure absolute vacuum pressures without the necessity of providing the customary absolute reference pressure on one side of the diaphragm.

Yet another object of the present invention is to provide a diaphragm gauge with a useful pressure range from above atmospheric pressure to very low pressures with a single diaphragm thickness.

A further object of the present invention is to provide a diaphragm gauge with continuous and precise automatic rezero.

Another object of the present invention is to provide a method for dynamically measuring the gas leakage past the piston used to compress the gas and for dynamically correcting the pressure indication for leakage.

A further object of the present invention is to provide a method for using a diaphragm gauge for measuring absolute vacuum pressures which provides automatic immunity from overpressure effects.

These as well as additional advantages of the present invention are achieved by providing a diaphragm vacuum gauge for determining the pressure within an evacuated chamber including a cylinder positioned in fluid communication with the evacuated chamber with the cylinder forming a compressed gas chamber, a reciprocating piston received within the cylinder and mounted for reciprocal movement therein and a port or valve for providing selective fluid communication between the compressed gas chamber and the evacuated chamber. A drive mechanism is provided for reciprocating the piston between a retracted position, where the compressed gas chamber communicates with the evacuated chamber, and an extended position where communication between the compressed gas chamber and the evacuated chamber is interrupted, the extended position being a position where a pressure transducer determines that a predetermined pressure differential between the chambers has been reached. In the preferred embodiment, a stepper motor is used to measure a distance travelled by the piston at the point where the predetermined pressure differential is reached. Utilizing these parameters, a processor then determines the pressure of the gas within the evacuated chamber.

These as well as additional advantages of the present invention will become apparent from the following detailed description of the preferred embodiments when read in light of the several figures.

DETAILED DESCRIPTION OF THE PREFERRED EMBODIMENTS

Figure 1:
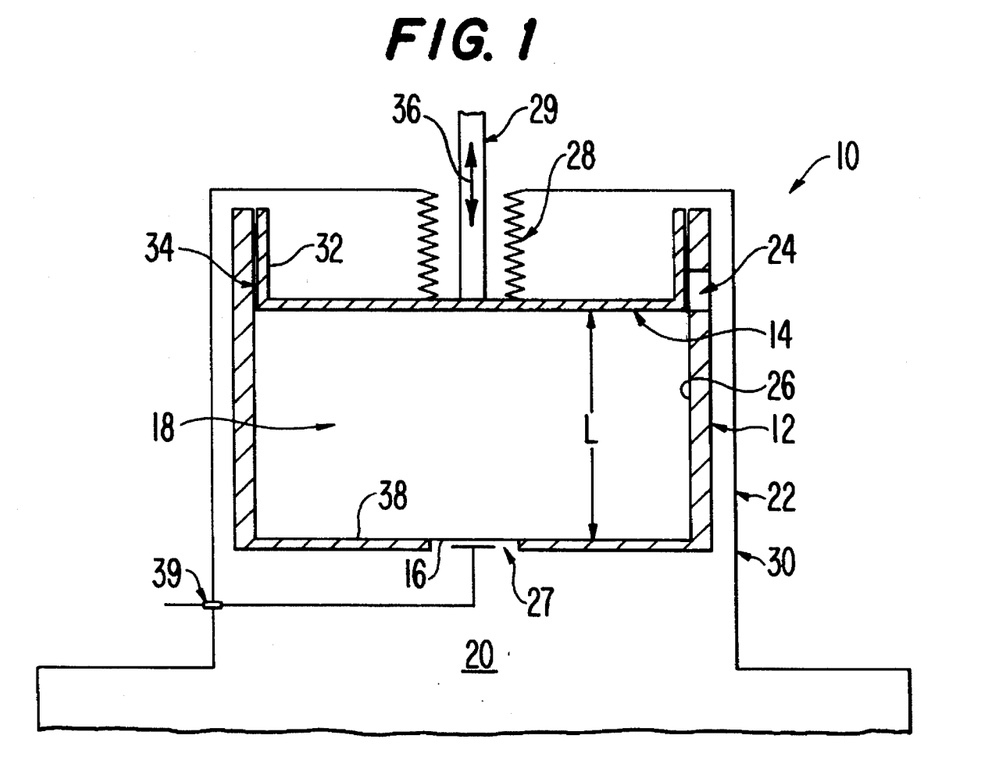
FIG. 1 is a schematic representation of the diaphragm vacuum gauge in accordance with a preferred embodiment of the present invention.

Referring now to the several figures and particularly FIG. 1, there is shown a diaphragm vacuum gauge 10 comprising a cylinder 12, a moveable close fitting piston 14, a flexible diaphragm 16 which separates a trapped volume of gas 18 to be compressed from the gas in the evacuated chamber 20 of the vacuum system 22 whose pressure is to be measured. A port or opening 24 is provided in the cylinder wall 26 which permits gas to flow freely in or out of the cylinder 12 from or to the vacuum system 22 when the piston 14 is in its fully retracted position. A pressure transducing device 27 for transducing the amount of deflection of the diaphragm into a pressure indication and a bellows motion seal 28 for transmitting piston motion from the piston rod 29 through the wall 30 of the vacuum system 22 are provided.

The cylinder 12 is preferably a circular cylinder with a smooth hard interior wall 26. The piston 14 also has a smooth hard outer surface on skirt 32 which closely fits in the cylinder 12 so that the gap 34 between the piston 14 and cylinder 12 is minimal but not so tight that the piston 14 does not move freely within the cylinder 12. Piston rings (not shown) or similar known seals may be used to minimize leakage past the piston 14. The skirt 32 of the piston 14 is preferably made relatively long so that the leakage path between the piston 14 and cylinder 12 is long. The port 24 is preferably a relatively narrow rectangular slot with the long side extending in a direction of piston travel as exemplified by arrow 36. A narrow rectangle is preferred so that when the piston 14 covers the port 24 on the down stroke a minimum amount of circumference of the cylinder 12 is exposed as a leakage path for gas out of the cylinder 12. Alternatively, a valve (not shown) may be used to open and close the port rather than relying on the piston 14 to seal the port 24.

The pressure transducing device 27 can be a small commercially available piezoresistive or capacitance pressure sensor, or the like fabricated using silicon processing techniques common in the semiconductor industry. The device 27 may be hermetically sealed to a bottom 38 of the cylinder 12 with an o-ring or other sealing means (not shown). If required, the end of the piston 14 can be suitably shaped to occupy any dead space in the end of the cylinder 12 when the piston 14 is fully extended. Alternatively the pressure transducing device 27 can be a diaphragm capacitance manometer as illustrated in FIG. 1 with the flexible diaphragm 16 forming the closed end of the cylinder 12 and having an electrical feed thru 39 in the vacuum system wall 30. The remainder of the capacitance manometer can be of a conventional design. It should be noted, however, that the pressure sensor may be any device capable of sensing a differential pressure and having a geometry compatible with achieving a relatively high compression ratio. The bellows motion seal 28 is preferably made of metal and with a length selected to provide long life. Means for mounting the cylinder 12 in the vacuum system 22 are not shown.

Figure 2:
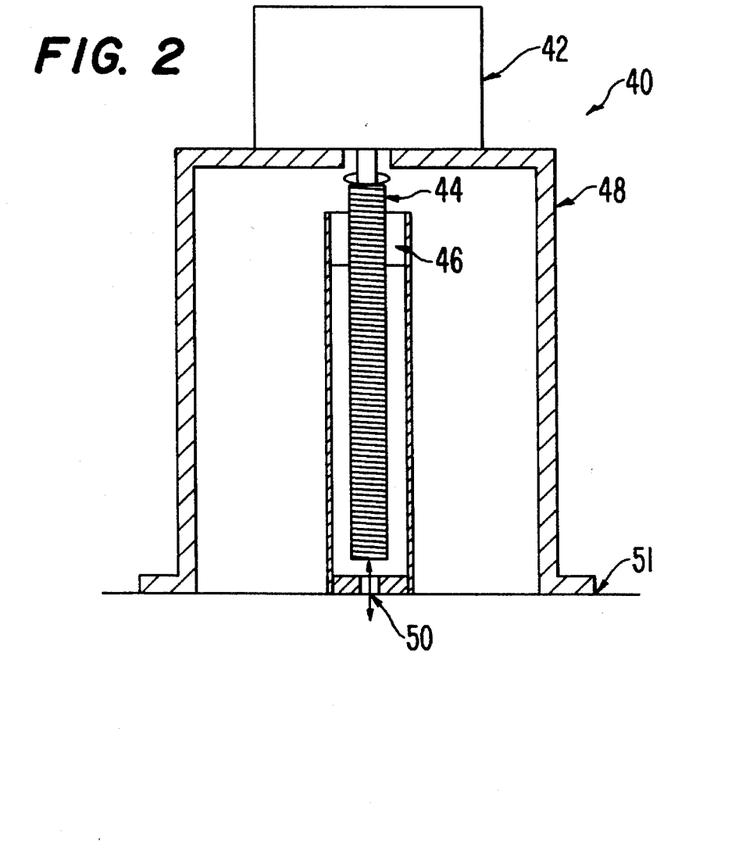
FIG. 2 is a schematic representation of a drive mechanism for providing precisely controlled movement of the piston member in accordance with a preferred embodiment of the present invention.

Referring now to FIG. 2, there is shown a mechanical drive mechanism assembly 40 for providing a precisely controlled variable compression ratio. The drive mechanism 40 includes a stepper motor 42, a drive screw 44 and nut 46, a mounting bracket 48, a nut 50 for attaching the drive screw 44 to the piston rod 29, and a flange 51 for securing the assembly 40 to the vacuum system 22. A typical stepper motor can produce extremely rapid motor step angles, typically 1.8°, but which can be as small as 0.0144°. Stepping accuracy is typically noncumulative so that the final rotation position is never more than approximately 5% of one full step regardless of the number of steps from the intended position. The step angle and pitch of the drive screw 44 are selected to give the desired resolution in piston position while still providing the desired speed of piston travel.

Figure 3:
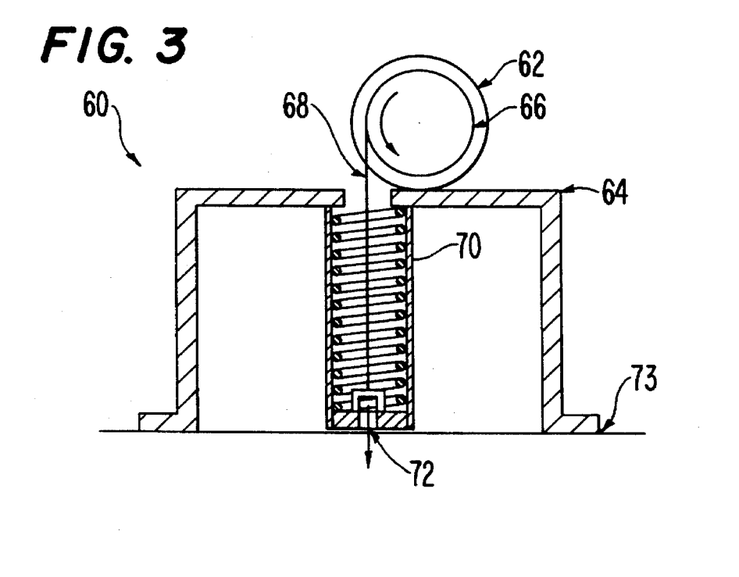
FIG. 3 is a schematic representation of a drive mechanism for providing precisely controlled movement of the piston member in accordance with an alternative embodiment of the present invention.

FIG. 3 illustrates an alternative mechanical drive mechanism 60 for providing a precisely controlled variable compression ratio including a stepper motor 62, support bracket 64, drive drum 66, a taut band 68, and a spring 70 to provide compression. The spring 70 is confined by a nut 72 for attachment to the piston rod 29 and the support bracket 64 and places the band 68 in tension such that the piston rod 29 moves in response to rotation of the stepper motor 62. The support bracket 64 also includes a flange 73 for securing the support bracket 64 in the proper position adjacent the cylinder 12 of FIG. 1. While two alternative drive mechanisms are set forth in FIGS. 2 and 3, these mechanisms are set forth by way of example, and any mechanism which can precisely position the piston 14 and measure the position of the piston 14 may be used. While the mechanism 60 illustrated in FIG. 3 is not exposed to the inherent wear of the screw illustrated in FIG. 2, the mechanism 40 of FIG. 2 will be discussed in detail with respect to the operation of the preferred embodiment of the invention in order to simplify the discussion.

The method of measuring an unknown pressure $P_x$ in the vacuum system using the wide range vacuum gauge assembled using the diaphragm vacuum gauge 10 illustrated in FIG. 1 combined with the drive mechanism 40 illustrated in FIG. 2 will now be discussed in detail.

Initially, the following assumptions need be made. It should be noted that these assumed values may be readily varied in order to provide a wide range vacuum gauge which reliably and accurately measures the unknown pressure $P_x$ in the vacuum system. The assumptions and system parameters are as follows:

1. The diaphragm 16 is rated for a maximum differential operating pressure $\Delta P_m$ of, for example, 1 PSI.
2. The piston 14 is fully retracted and the port 24 in the cylinder 12 is open to the evacuated chamber 20.
3. Let $P_x$=the unknown pressure in the evacuated chamber 20 and in the cylinder 12 when the piston 14 is in the retracted position.
4. Let L=the maximum length of the cylinder 12 of trapped gas, that is, the length of the cylinder when the port 24 is just closed as illustrated in FIG. 1.
5. Let $L_x$=the length of the cylinder 12 of compressed gas that was initially at unknown pressure $P_x$, but is now at a pressure sufficient to create a pressure difference across the diaphragm 16 of $\Delta P_m$.
6. Let A=the cross sectional area of the cylinder 12.
7. Thus, the initial volume of trapped gas in the cylinder 12 satisfies the formula:

$$V_{initial} = LA \tag{1}$$

The piston 14 is then caused to rapidly advance downward such that the compression time ranges from 0.1 second to 10 seconds, thus compressing the gas in the cylinder 12 initially at a pressure $P_x$ until the differential pressure across the diaphragm 16 is $\Delta P_m$. Accordingly, by using a variable compression ratio, the maximum differential pressure across the diaphragm 16 is automatically limited to the rated value $\Delta P_m$ for the diaphragm 16 regardless of the pressure in the evacuated chamber 20. In doing so, the objective of providing automatic immunity to overpressure of the diaphragm 16 is achieved. Inadvertent overpressuring is a serious problem with known diaphragm gauges as discussed hereinabove. By only moving the piston 14 the distance required to achieve a predetermined $\Delta P_m$, the diaphragm will never be overpressured regardless of the pressure in the evacuated chamber 20.

The distance the piston 14 advances is a distance $\Delta L_x$, where $$\Delta L_x = L - L_x \tag{2}$$

This distance $\Delta L_x$ is determined from the piston 14 position where the port 24 is just sealed, that being the position illustrated in FIG. 1, to the end of its compression stroke when the pressure differential equals $\Delta P_m$. As $P_x$ changes, the value of these parameters will change. The subscript x is used to uniquely identify parameters with the unknown pressure $P_x$. $\Delta L_x$ can readily be determined by circuitry well known in the art for counting the number of stepper motor steps N, and by a one time measurement of the lead of the drive screw 44.

Accordingly, the compression ratio defined as the initial volume of gas divided by the final volume of compressed gas satisfies the formula:

$$R_x = \frac{V_{initial}}{V_{final}} = \frac{LA}{L_x A} = \frac{L}{L_x} = \frac{L}{L - \Delta L_x} \tag{3}$$

It should be noted that the above calculation ignores the slight deflection of the diaphragm 16 which may be accounted for if determined to be significant by means well known in the art.

8. Let $P_{1x}$=The maximum pressure of trapped gas at the completion of the compression stroke when the differential pressure across the diaphragm is $\Delta P_m$.

Thus, $\Delta P_m$ satisfies the following:

$$\Delta P_m = P_{1x} - P_x, \text{ and} \tag{4}$$

$$P_{1x} = R_x P_x \tag{5}$$

Substituting equation (5) into equation (4) results in:

$$P_x = \frac{\Delta P_m}{R_x - 1} \tag{6}$$

And substituting equation (3) into equation (6) yields:

$$P_x = \frac{\Delta P_m (L - \Delta L_x)}{\Delta L_x} \tag{7}$$

Accordingly, from the foregoing, the unknown pressure $P_x$ can be calculated by first compressing the trapped gas until the differential pressure across the diaphragm 16 is $\Delta P_m$ and then measuring the piston travel $\Delta L_x$ required to provide a differential pressure $\Delta P_m$ and subsequently processing these values by a processor. This process may be repeated periodically, for example, every 2 seconds to follow a continuously changing vacuum system pressure. Thus, the objective of measuring the absolute pressure in the vacuum system without requiring an absolute reference pressure has been achieved. It should be noted that if the pressure $P_x$ changes significantly during the compression stroke, the calculated value of $P_x$ will be in error. However, when $P_x$ is changing rapidly an accurate measurement of $P_x$ is typically not required.

An important step in this process is assuring that the port 24 is open a sufficiently long time to assure that the pressure difference across the diaphragm 16 is zero before the next compression stroke is initiated. A very important benefit is achieved by providing for automatic rezeroing of the pressure sensing means during the time when the pressure difference across the diaphragm 16 is zero between compression strokes. Thus, zero shifts due to creep in the diaphragm or other parts and temperature induced changes of the zero reading are greatly reduced. Such zero shifts are some of the most significant causes of error in diaphragm manometers presently used. Correcting for zero shift in a conventional capacitance manometer is a time consuming process involving pumping the vacuum system to a pressure significantly lower than the lowest pressure to be measured and then resetting the zero. The system in accordance with the present invention eliminates this problem.

Even though piston rings or similar seals are used to reduce leakage, gas leakage past the piston may still be unacceptably high and the calculated value of $P_x$ may be in error due to these leakage effects. Gas leakage may be corrected for in the following manner.

Figure 4:
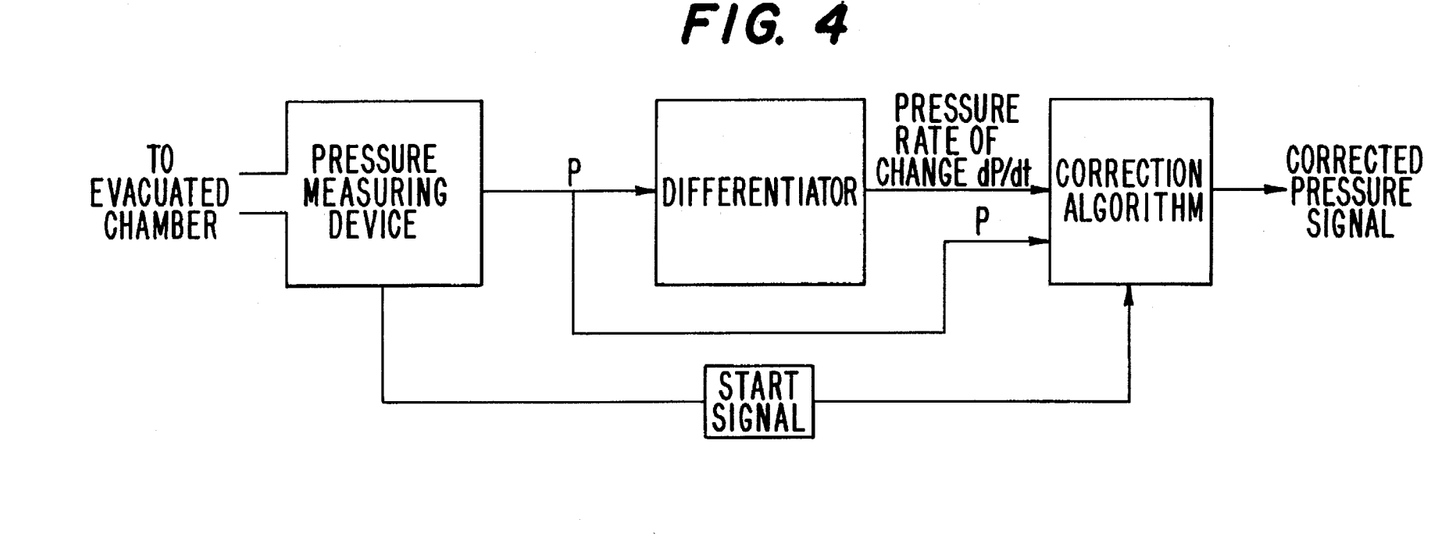
FIG. 4 is a schematic diagram of the correction process carried out for compensating for gas leakage past the piston in accordance with the preferred embodiment of the present invention.

Referring to FIG. 4, circuitry is shown for determining the rate of change of pressure of compressed gas (dp/dt). This circuitry may be used to measure (dp/dt) on a continuous basis. At the end of the compression stroke (dp/dt)=0 and as gas leakage past the piston 14 occurs, the pressure of trapped gas will fall and (dp/dt) will become negative. The appearance of a negative (dp/dt) can be used as a start signal to the correction algorithm block shown in FIG. 4 to calculate a correction factor and correct the pressure indication as a function of the leakage of gas past the piston 14. Alternatively, a start signal may be generated utilizing a stepper motor signal. Gas leakage will occur during the compression stroke. Initially the gas leakage will be negligible when the differential pressure is negligible, and the gas leakage will be at a maximum at the end of the compression stroke. The amount of leakage will depend on how far the piston 14 extends beyond the port 24 and on the pressure differential as well as on the gap between the piston 14 and cylinder 12 which may change with temperature fluctuations and with use.

Assuming the maximum rate of pressure decrease $(dp/dt)_{mx}$ in the compressed volume of gas is measured at the end of the compression stroke when the unknown gas pressure in the vacuum system is $P_x$ as calculated by the precessor, the rate of gas leakage out of the compressed volume will be:

$$\left( \frac{dp}{dt} \right)_{mx} L_x A \text{ torr liter/sec} \qquad (8)$$

Equation 8 represents the leak rate at a maximum pressure difference across the piston 14. A good approximation of the average leak rate during the compression stroke will be ½ of this maximum rate or:

$$1/2 \left( \frac{dp}{dt} \right)_{mx} L_x A \text{ torr liter/sec} \qquad (9)$$

Leakage occurs during the travel time of the piston $\Delta t_x$ during the compression stroke where:

$$\Delta t_x = \Delta L_x/y \text{ seconds} \qquad (10)$$

where y is the average speed of the piston during the compression stroke.

Accordingly, the quantity of gas leaking past the piston during the compression stroke satisfies the following:

$$1/2 \left( \frac{dp}{dt} \right)_{mx} L_x A \frac{\Delta L_x}{y} \text{ torr liters} \qquad (11)$$

It should be noted that the initial quantity of gas in the cylinder at the start of the compression stroke is $L A P_x$ but a smaller amount was actually compressed due to leakage. This smaller amount is the original amount less leakage and satisfies the following:

$$L A P_x - 1/2 \left( \frac{dp}{dt} \right)_{mx} L_x A \frac{\Delta L_x}{y} \text{ torr liters} \qquad (12)$$

The measured compression ratio $R_x$ will be too large by the ratio of the initial quantity of gas $V_i$ to the final quantity of compressed gas $V_f$ or:

$$\frac{1}{K} = \frac{V_i}{V_f} = \frac{L A P_x}{\left[ L A P_x - \frac{1}{2y} \left( \frac{dp}{dt} \right)_{mx} L_x A \Delta L_x \right]} \qquad (13)$$

Thus, the corrected compression ratio $R_{xc}$ is obtained by multiplying the measured compression ratio $R_x$ by the reciprocal of equation (13) or by K, such that:

$$R_{xc} = K R_x \qquad (14)$$

Accordingly, by substitution of equations, to account for leakage, the unknown pressure $P_x$ satisfies:

$$P_x = \frac{\Delta P_m}{R_{xc} - 1}$$

$$= \frac{\Delta P_m}{K R_x - 1}$$

$$= \frac{\Delta P_m}{K \left( \frac{L}{L - \Delta L_x} \right) - 1} \qquad (15)$$

By substituting equation (13) into equation (15), the unknown pressure $P_x$ becomes:

$$P_x = \frac{\Delta P_m}{\left[ \frac{L P_x - \frac{\Delta P_m P_x (L \Delta L_x)}{(2y) L P_x}}{L P_x - \frac{1}{(2y)} \left( \frac{dp}{dt} \right)_{mx} L_x \Delta L_x} \right] \left[ \frac{L}{L - \Delta L_x} \right] - 1} \qquad (16)$$

Accordingly, equation (16) can be readily solved for $P_x$ as follows:

$$-\frac{1}{(2y)} \left( \frac{dp}{dt} \right)_{mx} L_x \Delta L_x P_x + P_x^2 \Delta L_x = \Delta P_m P_x (L - \Delta L_x) \qquad (17)$$

$$P_x = \frac{\Delta P_m (L - \Delta L_x) + \frac{1}{(2y)} \left( \frac{dp}{dt} \right)_{mx} L_x \Delta L_x}{\Delta L_x}$$

Equation (17) being the value of $P_x$ corrected for gas leakage during the compression stroke. It should be noted that for zero leakage $(dp/dt)_{mx} = 0$ and the above expression for $P_x$ then becomes:

$$P_x = \frac{\Delta P_m (L - \Delta L_x)}{\Delta L_x} \quad (18)$$

which is the same as equation (7) where zero leakage was assumed.

Each of the above-noted parameters of equation (17) for $P_x$ can readily be measured and the calculations of $P_x$ made by known techniques. That is, the pressure difference across the diaphragm $\Delta P_m$ is determined by the diaphragm capacitance manometer illustrated in FIG. 1, the lengths, L, $L_x$ and $\Delta L_x$ are determined by the position of the stepper motor 42, $(dp/dt)_{mx}$ being determined by the diaphragm capacitance manometer and the speed y by the stepper motor 42 as well. Thus, gas leakage past the piston 14 can be dynamically corrected for after a compression stroke. In this way, the errors due to leakage may be reduced to negligible values. It should be noted that this method of correcting for leakage depends on the value of $P_x$ remaining relatively fixed during the short time while $(dp/dt)_{mx}$ is being measured. However, if $P_x$ is changing rapidly, then an accurate leakage correction is of little value.

The pressure range which can be measured utilizing the arrangement shown in FIG. 1 is limited by the minimum incremental motion of the piston 14 which can be resolved. At low unknown pressures $P_x$, when a high compression ratio must be utilized to achieve a given $\Delta P_m$, only a small increment in $\Delta L$ is required to compress the gas by, say, 1% of reading. At high unknown pressures $P_x$ when a small compression ratio is required to achieve a given $\Delta P_m$, only a small increment in $\Delta L$ is required to compress the gas by 1% of reading. If the minimum change in $\Delta L$ which can be reliably measured is, for example, 0.00005 in., the maximum and minimum pressures which can be resolved to 1% are shown in Table I for different $\Delta P_m$'s.

TABLE I

| $\Delta P_m$ (Torr) | $P_x$ max (Torr) | $P_x$ min (Torr) |
| --- | --- | --- |
| 51 (1 PSI) | 10,000 | 0.25 |
| 1 | 200 | $5 \times 10^{-3}$ |
| $1 \times 10^{-1}$ | 20 | $5 \times 10^{-4}$ |
| $1 \times 10^{-2}$ | 2 | $5 \times 10^{-5}$ |

Maximum and minimum pressures which can be resolved to 1% for various $\Delta P_m$ using the device shown in FIG. 1 for L=1 in. and a minimum measured increment in piston travel of 0.00005 in.

Figure 5:
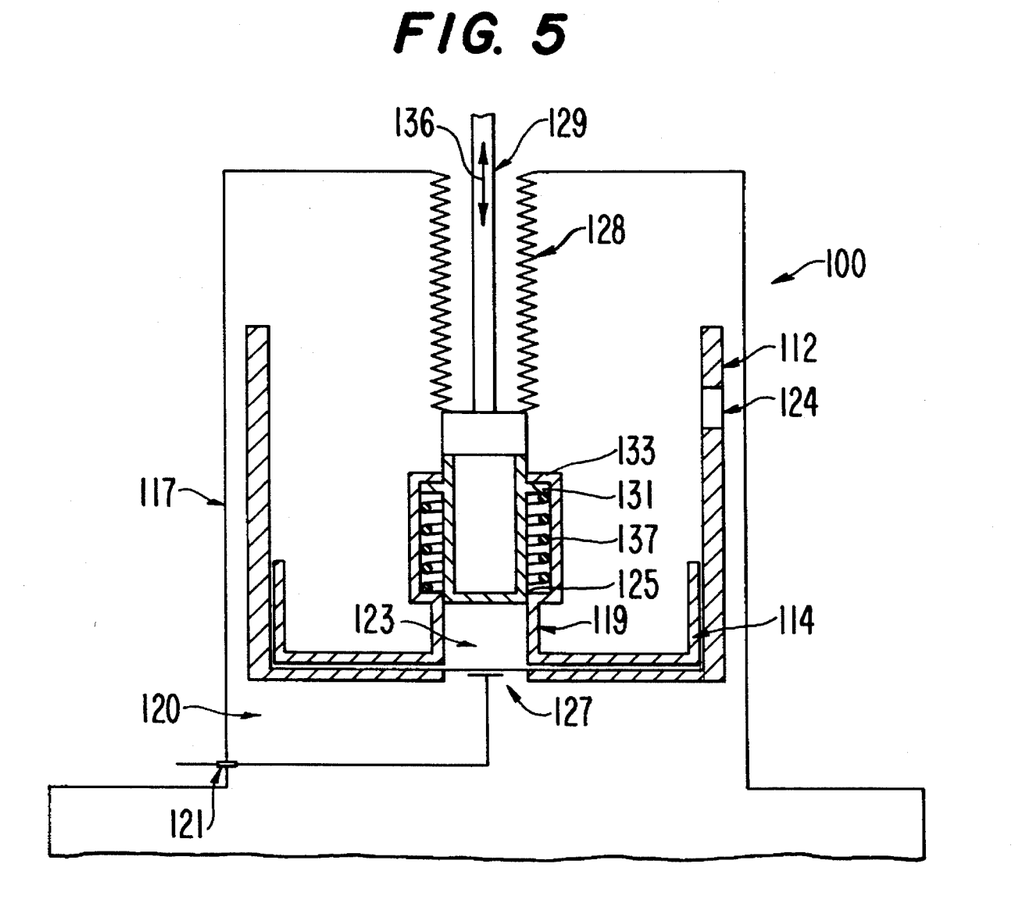
FIG. 5 is a schematic representation of an alternative embodiment of the present invention.

FIG. 5 illustrates an alternative embodiment for compressing the trapped gas to higher compression ratios and with greater resolution of the distance travelled by the piston. The system 100 includes a large cylinder 112, a large piston 114, a port 124 in the large cylinder wall connecting the large cylinder 112 to an evacuated chamber 120, a pressure difference sensing means in the form of a capacitance manometer diaphragm and plate 127 having an electrical feed thru 121 in the wall 117 of evacuated chamber 120, a small cylinder 119 in the end of the large piston 114 forming a small compression chamber 123, a small piston 125, a small piston flange 131, a back stop 133, a spring 137 and flexible bellows 128. The spring force of spring 137 is sufficient to hold the small piston flange 131 firmly against the backstop 133 as the piston assembly is advanced by a drive mechanism connected to piston rod 129 such as that shown in FIG. 2. The piston rod 129 is reciprocated in a direction shown by arrow 136 such that the small diameter piston 125 moves with the larger piston 114 until the larger piston encounters a mechanical stop at the limit of its downward travel. The stop may take any form so long as it stops the forward movement of the large piston 114. When the larger piston 114 stops, the smaller piston 125 is designed to continue advancing downward, compressing the spring 137 and further compressing the trapped gas until the predetermined pressure difference $\Delta P_m$ across the diaphragm 127 is realized. While FIG. 5 illustrates a two piston arrangement, three or more piston arrangements may also be used depending upon the particular application of the device. Each subsequent piston would be received in a cylinder formed in a previous piston. Further, while the piston arrangement of FIG. 5 illustrates the pistons as being concentrically positioned relative to one another, this need not be the case so long as each assembly communicates with the trapped volume of gas.

The method for measuring an unknown pressure $P_x$ in an evacuated chamber using the elements of FIG. 5 will now be explained in detail for two conditions. In condition 1, the maximum pressure difference across the diaphragm $\Delta P_m$ is assumed to be achieved before the large piston 114 bottoms out, that is, before the large piston 114 reaches the mechanical stop.

As with the previous embodiment, the following assumptions will be made:

1. The diaphragm 127 is rated for a maximum differential operating pressure $\Delta P_m$, for example, 1 PSI.
2. The two pistons 114 and 125 are fully retracted and the port 124 in the large cylinder 112 is open to the evacuated chamber 120. The zero setting of the diaphragm gauge may be reset at this point to minimize zero shift errors.
3. Let $P_x$=The unknown pressure in the evacuated chamber and in the large and small cylinders.

Accordingly, in Condition 1, the large piston 114 is not bottomed out and the compression ratio, which is equal to the ratio of the initial volume of compressed gas to the final volume satisfies the following equation:

$$R_x = \frac{V_i}{V_f} = \frac{L_1 A_1 + L_2 A_2}{L_{1x} A_1 + L_2 A_2} \quad (19)$$

$$= \frac{L_1 A_1 + L_2 \rho A_1}{L_{1x} A_1 + L_2 \rho A_1}$$

$$= \frac{L_1 + \rho L_2}{L_{1x} + \rho L_2}$$

where:
- $A_1$=The cross-sectional area of the large cylinder.
- $A_2$=The cross-sectional area of the small cylinder.
- $\rho = A_2/A_1$
- $L_1$=The maximum length of the large cylinder of trapped gas when the port is just closed.
- $L_{1x}$=The length of the large cylinder when the pressure difference across the diaphragm is $\Delta P_m$ and the small piston flange is still held firmly against the back stop.
- $L_{1x}$ min=The length of the large cylinder when the large cylinder is bottomed out at the lower limit of its travel.
- $L_2$=The maximum length of the small cylinder with the small piston fully retracted.
- $L_{2x}$=The length of the small cylinder when the pressure difference across the diaphragm is $\Delta P_m$ and the large piston is at the lower limit of its travel.

Assuming $P_{1x}$ equals the maximum pressure in the large and small cylinders at the end of the compression stroke for Condition 1 when the pressure difference across the diaphragm is $\Delta P_m$, $\Delta P_m$ satisfies the equation:

$$\Delta P_m = P_{1x} - P_x \text{ and,} \qquad (20)$$

$$P_{1x} = R_x P_x \qquad (21)$$

Substituting equation (21) into equation (20) yields:

$$P_x = \frac{\Delta P_m}{R_x - 1} \qquad (22)$$

and substituting equation (19) into equation (22) results in:

$$P_x = \frac{\Delta P_m}{\frac{L_1 + \rho L_2}{L_{1x} + \rho L_2} - 1} = \frac{\Delta P_m(L_{1x} + \rho L_2)}{L_1 + \rho L_2 - L_{1x} - \rho L_2} \qquad (23)$$

$$P_x = \frac{\Delta P_m(L_{1x} + \rho L_2)}{L_1 - L_{1x}}$$

Utilizing the relations $\Delta L_x = L_1 - L_{1x}$ Condition 1 is represented by equation (24) as follows:

$$P_x = \frac{\Delta P_m(L_1 - \Delta L_{1x} + \rho L_2)}{\Delta L_{1x}} \qquad (24)$$

It should be noted that when $L_2=0$, this expression for $P_x$ becomes the same as was previously obtained utilizing the system of FIG. 1 without a second piston.

In Condition 2, where the maximum pressure difference across the diaphragm $\Delta P_m$ is achieved after the large piston 114 bottoms out, the compression ratio is described as:

$$R_x = \frac{V_i}{V_f} = \frac{L_1 A_1 + L_2 A_2}{L_{1x\,min} A_1 + L_{2x} A_2} \qquad (25)$$

$$= \frac{L_1 A_1 + L_2 \rho A_1}{L_{1x\,min} A_1 + L_{2x} \rho A_1}$$

$$= \frac{L_1 + \rho L_2}{L_{1x\,min} + \rho L_{2x}}$$

Assuming $P_{2x}$ equals the maximum pressure in the small cylinder 119 at the end of the compression stroke of the large cylinder 112 when the pressure difference across the diaphragm is $\Delta P_m$, $\Delta P_m$ satisfies the equation $$\Delta P_m = P_{2x} - P_x \text{ and,} \qquad (26)$$

$$P_{2x} = R_x P_x \qquad (27)$$

Substituting equation (27) into equation (26) yields:

$$P_x = \frac{\Delta P_m}{R_x - 1} \qquad (28)$$

Substituting equation (25) into equation (28) gives $$P_x = \frac{\Delta P_m}{\frac{L_1 + \rho L_2}{L_{1x\,min} + \rho L_{2x}} - 1} \qquad (29)$$

Utilizing the relationship $L_{2x} = L_2 - \Delta L_{2x}$ Condition 2 is represented by equation (30) as follows:

$$P_x = \frac{\Delta P_m}{\frac{L_1 + \rho L_2}{L_{1x\,min} + \rho(L_2 - \Delta L_{2x})} - 1} \qquad (30)$$

$$= \frac{\Delta P_m(L_{1x\,min} + \rho L_2 - \rho \Delta L_{2x})}{L_1 + \rho L_2 - L_{1x\,min} - \rho L_2 + \rho \Delta L_{2x}}$$

$$P_x = \frac{\Delta P_m(L_{1x\,min} + \rho L_2 - \rho L_{2x})}{L_1 - L_{1x\,min} + \rho \Delta L_{2x}}$$

Accordingly, utilizing the arrangement shown in FIG. 5, $P_x$ can be readily determined for Conditions 1 and 2 by measuring several parameters utilizing known methods and calculating $P_x$ utilizing known instrumentation techniques. As mentioned previously, the pressure difference across the diaphragm $\Delta P_m$ is determined by the diaphragm capacitance manometer illustrated in FIG. 5 and the lengths $L_1$, $L_{1x\,min}$, $L_2$, $L_{2x}$ and $\Delta L_{2x}$ are determined by the position of the stepper motor of FIG. 2.

In Table II there is shown the maximum and minimum pressures which can be resolved with the dual piston system illustrated in FIG. 5.

TABLE II

| $\Delta P_m$ (Torr) | $P_x$ max (Torr) | $P_x$ min (Torr) |
|---|---|---|
| 51 (1 PSI) | 10,000 | 0.030 |
| 1 | 200 | $6 \times 10^{-4}$ |
| 0.1 | 20 | $6 \times 10^{-5}$ |

Maximum and minimum pressures which can be resolved to 1% for various $\Delta P_m$ using the device shown in FIG. 5 for $L_1 = 1$ in., $L_2 = 0.5$ in., $\rho = 0.1$, $L_{1x\,min} = 0.0005$ in. and a minimum measured increment in piston travel of 0.00005 in.

The maximum compression ratio which can be achieved with the arrangement of FIG. 5 is limited by the dead volume in the large cylinder when the large piston 114 bottoms out. Gas in this dead volume must also be compressed by advancing the small piston, thus limiting the maximum compression ratio which can be achieved. If the diaphragm sensor has a repeatability of, say, 0.5% of full scale, that is of $\Delta P_m$, the repeatability at one tenth of full scale will typically only be 5%. However, the repeatability of the measurement of $P_x$ utilizing the devices in FIGS. 1 and 5 will be 0.5% of reading. It is this improvement in repeatability which constitutes a major benefit of the present invention. If the repeatability of a given diaphragm pressure sensor is sufficiently good at, say, one tenth of full scale, the lower pressure range of the present invention may be extended by selecting a pressure difference of approximately $0.1 \Delta P_m$ as the fixed pressure difference.

Therefore, in accordance with the present invention, compressing gas in a known volume with a solid piston (as opposed, for example, to the liquid mercury piston employed in a McLeod gauge) until the pressure difference across a diaphragm is a known amount and calculating the initial pressure in the known volume from measurements of the geometry after compression is achieved. Additionally, in accordance with a preferred embodiment of the invention the present invention, a measured, variable compression ratio and a known (or predetermined) fixed pressure difference across a diaphragm can be used to extend the pressure range which can be measured with a single diaphragm thickness. Further, as can be appreciated from Equation (7), a measured, variable compression ratio and a measured, variable pressure difference across a diaphragm may also be utilized in order to extend the pressure range which can be measured with a single diaphragm thickness. Alternatively, a known (or predetermined) fixed compression ratio and a measured, variable pressure difference may be also utilized to extend the pressure range which can be measured with a single diaphragm thickness. Further, multiple known fixed pressure differences and multiple known fixed compression ratios may be utilized in extending the pressure range which can be measured with a single diaphragm thickness. In utilizing the diaphragm vacuum gauge in accordance with the present invention, a full scale repeatability is achieved such that the unknown pressure may be reliably and repeatably read.

While the present invention has been described with reference to a preferred embodiment, it should be appreciated by those skilled in the art that the invention may be practiced otherwise than as specifically described herein without departing from the spirit and scope of the invention. It is, therefore, to be understood that the spirit and scope of the invention be limited only by the appended claims.

What is claimed is:

1. A device for determining a pressure of gas in an evacuated chamber comprising:

a cylinder positioned in fluid communication with the evacuated chamber, said cylinder forming a compressed gas chamber;

a reciprocating piston received within said cylinder and mounted for reciprocal movement within said cylinder;

a communication means for selectively fluidly communicating said compressed gas chamber with the evacuated chamber;

a drive means for reciprocating said piston between a retracted position, where said compressed gas chamber communicates with the evacuated chamber, and an extended position where communication between said compressed gas chamber and said evacuated chamber is interrupted;

a determining means for determining when a predetermined pressure differential between said compressed gas chamber and the evacuated chamber is reached; and a processing means for determining the pressure of the gas within the evacuated chamber based on said predetermined pressure differential and when said predetermined pressure differential is reached.

2. The device as defined in claim 1, wherein an initial pressure of the gas within said compressed gas chamber is equal to the pressure of the gas in the evacuated chamber.

3. The device as defined in claim 1, further comprising a measuring means for measuring a distance travelled by said piston when said predetermined pressure differential is reached wherein said measured distance is used by said processing means to determine the pressure of the gas in the evacuated chamber.

4. The device as defined in claim 3, wherein said processing means determines the pressure of the gas within the evacuated chamber in accordance with the following equation:

$$P_x = \frac{\Delta P_m (L - \Delta L_x)}{\Delta L_x}$$

where $P_x$ is the pressure of the gas within the evacuated chamber, $\Delta P_m$ is said predetermined pressure differential, L is an effective length of said cylinder and $\Delta L_x$ is the difference between the effective length of said cylinder and an effective distance travelled by said piston.

5. The device as defined in claim 4, wherein said communication means is an elongated port formed in said cylinder having a longer length extending in a direction of movement of said piston.

6. The device as defined in claim 5, wherein said effective length of said cylinder is the distance from a lowermost boundary of said port and a bottom of said cylinder.

7. The device as defined in claim 6, further comprising a correction means for correcting the determined pressure of the gas within the evacuated chamber to account for leakage of compressed gas between said piston and said cylinder.

8. The device as defined in claim 7, wherein said correction means includes means for correcting a measured compression ratio by a ratio of an initial volume of gas in said cylinder and a final volume of gas in said cylinder when said predetermined pressure differential has been reached.

9. The device as defined in claim 8, wherein a correction value K is obtained in accordance with the following equation:

$$K = \frac{V_f}{V_i} = \frac{\left[ LAP_x - \frac{1}{(2y)} \left( \frac{dp}{dt} \right)_{mx} L_x A \Delta L_x \right]}{LAP_x}$$

where $V_f$ is the final volume of compressed gas, $V_i$ is the initial volume of compressed gas, A is the cross-sectional area of said cylinder, y is an average speed of said piston during a compression stroke, $(dp/dt)_{mx}$ is a maximum rate of pressure decrease in the compressed volume of gas and $L_x$ is the effective distance travelled by said piston.

10. The device as defined in claim 3, wherein said measuring means for measuring the distance travelled by said piston is a stepper motor.

11. The device as defined in claim 1, wherein said means for determining when said predetermined pressure differential is reached is a pressure transducer.

12. A device for determining a pressure of a gas in an evacuated chamber comprising:

a first cylinder positioned in fluid communication with the evacuated chamber, said first cylinder forming a first compressed gas chamber;

a first reciprocating piston received within said first cylinder and mounted for reciprocal movement within said cylinder;

a second cylinder formed in said first piston;

a second reciprocating piston received within said second cylinder and mounted for reciprocal movement within said cylinder;

a communication means for selectively fluidly communicating said compressed gas chamber with the evacuated chamber;

a drive means for reciprocating each of said first and second pistons between retracted positions and extended positions;

a determining means for determining when a predetermined pressure differential between said compressed gas chamber and the evacuated chamber is reached;

a processing means for determining the pressure of the gas within the evacuated chamber based on the predetermined pressure differential and when said predetermined pressure differential is reached.

13. The device as defined in claim 12, wherein an initial pressure of the gas within said compressed gas chamber is equal to the pressure of the gas in the evacuated chamber.

14. The device as defined in claim 13, wherein said communication means is an elongated port formed in said first cylinder having a longer length extending in a direction of movement of said first piston.

15. The device as defined in claim 14, wherein said effective length of said first cylinder is the distance from a lowermost boundary of said port and a bottom of said first cylinder.

16. The device as defined in claim 12, further comprising a correction means for correcting the determined pressure of the gas within the evacuated chamber to account for leakage of compressed gas between said first piston and said first cylinder.

17. The device as defined in claim 12, wherein said correction means includes means for correcting a measured compression ratio by a ratio of an initial volume of gas in said first and second cylinder and a final volume of gas in said first and second cylinder when said predetermined pressure differential has been reached.

18. The device as defined in claim 17, wherein said second piston includes a flange extending from a periphery thereof and said second cylinder includes a stop with said flange being biased into contact with said stop when said first piston is moved from said retracted position to said extended position.

19. The device as defined in claim 18, wherein said drive means displaces said second piston when said first piston reaches said extended position.

20. The device as defined in claim 19, further comprising a biasing means for biasing said flange toward said stop.

21. The device as defined in claim 12, wherein said means for determining when said predetermined pressure differential is reached is a pressure transducer.

22. A method for determining a pressure of gas in an evacuated chamber comprising:
   providing a cylinder and piston assembly, said cylinder forming a compressed gas chamber selectively communicating with the evacuated chamber;
   positioning said piston in a retracted position where said compressed gas chamber and the evacuation chamber are in fluid communication with one another;
   advancing said piston in said cylinder to an extended position, the extended position being that position where a predetermined pressure differential between gas in said compressed gas chamber and the gas in the evacuated chamber is reached;
   determining the position of said piston to reach the extended position; and
   determining the pressure of the gas in the evacuated chamber based on said predetermined pressure differential and said position of said piston.

23. The method as defined in claim 22, wherein an initial pressure of the gas within said compressed gas chamber is equal to the pressure of the gas in the evacuated chamber.

24. The method as defined in claim 22, wherein the pressure of the gas within the evacuated chamber is determined in accordance with the following equation:

$$P_x = \frac{\Delta P_m (L - \Delta L_x)}{\Delta L_x}$$

where $P_x$ is the pressure of the gas within the evacuated chamber, $\Delta P_m$ is said predetermined pressure differential, L is an effective length of said cylinder and $\Delta L_x$ is the difference between the effective length of said cylinder and an effective distance travelled by said piston.

25. The method as defined in claim 22, further comprising the step of correcting the determined pressure of the gas in the evacuated chamber based on leakage of compressed gas between said piston and said cylinder when said piston is advanced from said retracted position to said advanced position.

26. The method as defined in claim 25, wherein said correcting step includes correcting a measured compression ratio by a ratio of an initial volume of gas in said cylinder when said piston is in the retracted position and a final volume of gas in said cylinder when said piston is in the advanced position and said predetermined pressure differential has been reached.

27. The method as defined in claim 25, wherein a correction value K is obtained in accordance with the following equation:

$$K = \frac{V_f}{V_i} = \frac{\left[ LAP_x - \frac{1}{(2y)} \left( \frac{dp}{dt} \right)_{mx} L_x A \Delta L_x \right]}{LAP_x}$$

where $V_f$ is the final volume of compressed gas, $V_i$ is the initial volume of compressed gas, A is the cross-sectional area of said cylinder, y is an average speed of said piston during a compression stroke, $(dp/dt)_{mx}$ is a maximum rate of pressure decrease in the compressed volume of gas and $L_x$ is the effective distance travelled by said piston.

28. A method for determining a pressure of a gas in a chamber comprising the steps of:
   compressing a gas of a known volume in a compressed gas chamber having an initial pressure equal to the pressure in the chamber until a predetermined pressure difference across a diaphragm positioned between said chamber and the known volume is reached; and
   determining the initial pressure of the gas in the known volume based on a geometry of the known volume after compression of the gas in the known volume.

29. The method as defined in claim 28, further comprising the step of determining a rate of change of the pressure of the compressed gas after compression is completed and correcting the determined initial pressure to account for gas leakage during the compression of the gas.

30. The method as defined in claim 29, wherein said predetermined pressure difference is reached in 0.1 to 10 seconds after the known volume of gas is isolated from said gas in said chamber.

31. The method as defined in claim 28, wherein the pressure of the gas in said compressed gas chamber is returned to the pressure of the gas in the chamber before a subsequent compression step is carried out.

32. The method as defined in claim 28, wherein the step of determining the initial pressure of the gas is further based on at least said predetermined pressure differential.

33. A method for determining a pressure of a gas in an evacuated chamber comprising the steps of:

compressing a gas of a known volume in a cylinder, said compressing carried out by a solid piston reciprocably received in said cylinder;

determining a pressure differential wherein said pressure differential is the difference between the pressure in the evacuated chamber and the cylinder;

determining a compression ratio of the gas within said cylinder; and determining the pressure of the gas in said evacuated chamber based on said pressure differential and said compression ratio.

34. The method as defined in claim 33, wherein said compression ratio is variable and said pressure differential is a predetermined fixed pressure differential.

35. The method as defined in claim 33, wherein said compression ratio is variable and said pressure differential is also variable.

36. The method as defined in claim 33, wherein said compression ratio is a predetermined, fixed compression ratio and said pressure differential is variable.

* * * * *

UNITED STATES PATENT AND TRADEMARK OFFICE
CERTIFICATE OF CORRECTION

PATENT NO. : 5,452,613

DATED : September 26, 1995

INVENTOR(S) : Daniel G. Bills et al.

It is certified that error appears in the above-identified patent and that said Letters Patent is hereby corrected as shown below:

Column 6, Equation (4), change

"$\Delta P_m = P_{ix} - P_x$" to --$\Delta P_m = P_{1x} - P_x$--.

Column 7, line 40, change "precessor" to --processor--.

Column 7, Equation (10), change

"$\Delta t_x 32\ \Delta L_x/y$ seconds" to --$\Delta t_x = \Delta L_x/y$ seconds--

UNITED STATES PATENT AND TRADEMARK OFFICE
CERTIFICATE OF CORRECTION

PATENT NO.  : 5,452,613
DATED       : September 26, 1995
INVENTOR(S) : Daniel G. Bills et al.

It is certified that error appears in the above-identified patent and that said Letters Patent is hereby corrected as shown below:

Column 8, Equation (16), change

"                                                                                "

to, $$P_x = \frac{\Delta \dot{P}_m}{\left[\dfrac{LP_x - \dfrac{1}{2y}\left(\dfrac{dp}{dt}\right)_{mx} L_x \Delta L_x}{LP_x}\right]\left[\dfrac{L}{L - \Delta L_x}\right] - 1}$$

UNITED STATES PATENT AND TRADEMARK OFFICE
CERTIFICATE OF CORRECTION

PATENT NO. : 5,452,613  
DATED : September 26, 1995  
INVENTOR(S) : Daniel G. Bills, et al.

Page 3 of 3

It is certified that error appears in the above-indentified patent and that said Letters Patent is hereby corrected as shown below:

$$= \frac{\Delta P_m P_x}{\left[L P_x - \frac{1}{(2y)}\left(\frac{dp}{dt}\right)_{mx} L_x \Delta L_x\right]\left[\frac{1}{L - \Delta L_x}\right] - P_x}$$

$$= \frac{\Delta P_m P_x (L - \Delta L_x)}{-\frac{1}{(2y)}\left(\frac{dp}{dt}\right)_{mx} L_x \Delta L_x + P_x \Delta L_x}$$

Signed and Sealed this

Twenty-first Day of May, 1996

Attest:

BRUCE LEHMAN

*Attesting Officer*      *Commissioner of Patents and Trademarks*